United States Patent
Odake et al.

(10) Patent No.: US 9,047,798 B2
(45) Date of Patent: Jun. 2, 2015

(54) DISPLAY APPARATUS AND METHOD OF DISPLAYING THREE DIMENSIONAL IMAGES USING PLURAL BARRIER STATES

(75) Inventors: Ryota Odake, Hwaseong-si (KR); Se-Joon Oh, Suwon-si (KR)

(73) Assignee: Samsung Display Co., Ltd. (KR)

( * ) Notice: Subject to any disclaimer, the term of this patent is extended or adjusted under 35 U.S.C. 154(b) by 261 days.

(21) Appl. No.: 13/612,628

(22) Filed: Sep. 12, 2012

(65) Prior Publication Data

US 2013/0271503 A1 Oct. 17, 2013

(30) Foreign Application Priority Data

Apr. 16, 2012 (KR) .................. 10-2012-0039309

(51) Int. Cl.
- G09G 3/36 (2006.01)
- G09G 3/00 (2006.01)
- H04N 13/04 (2006.01)
- G09G 3/20 (2006.01)

(52) U.S. Cl.
CPC .............. *G09G 3/003* (2013.01); *G09G 3/2022* (2013.01); *G09G 3/3611* (2013.01); *G09G 2320/0209* (2013.01); *H04N 13/0404* (2013.01); *H04N 13/0413* (2013.01); *H04N 13/0486* (2013.01)

(58) Field of Classification Search
CPC .......... H04N 13/0404; H04N 13/0413; H04N 13/0486
USPC .......................................................... 345/102
See application file for complete search history.

(56) References Cited

U.S. PATENT DOCUMENTS

| 7,952,548 | B2 | 5/2011 | Kim et al. | |
|---|---|---|---|---|
| 8,044,881 | B2 | 10/2011 | Nam et al. | |
| 2007/0091058 | A1* | 4/2007 | Nam et al. | 345/102 |
| 2011/0157471 | A1* | 6/2011 | Seshadri et al. | 348/564 |
| 2012/0162550 | A1* | 6/2012 | Jeong et al. | 349/15 |

FOREIGN PATENT DOCUMENTS

| JP | 2778543 | 5/1998 |
|---|---|---|
| KR | 1005211 | 12/2010 |

* cited by examiner

*Primary Examiner* — Viet Pham
(74) *Attorney, Agent, or Firm* — Innovation Counsel LLP (57) ABSTRACT

A display apparatus includes a display panel, a display panel driver, a light source part, a light directing element and a barrier driver. The display panel displays a 3D image by dividing a single 3D image frame into plural sub frames including one corresponding to a first stereoscopic view for display during a first sub frame and a second corresponding to a second stereoscopic view for display during a second sub frame. The light source part provides selectively blockable backlighting. The light directing element is disposed between the display panel and the light source part so as to implement selective blocking. The light directing element includes a barrier part and a lens part disposed on the barrier part. The barrier part has a plurality of first electrodes and a plurality of second electrodes crossing the first electrodes.

20 Claims, 6 Drawing Sheets

DISPLAY APPARATUS AND METHOD OF DISPLAYING THREE DIMENSIONAL IMAGES USING PLURAL BARRIER STATES

CROSS-REFERENCE TO RELATED APPLICATION

This application claims priority to Korean Patent Application No. 10-2012-0039309, filed on Apr. 16, 2012, and all the benefits accruing therefrom under 35 U.S.C. §119, the contents of which are herein incorporated by reference in their entireties.

BACKGROUND

1. Field of Disclosure

The present disclosure of invention relates to a display apparatus and to a method of displaying a three-dimensional ("3D") image using the display apparatus. More particularly, the present disclosure of invention relates to a display apparatus which uses a barrier layer for displaying 3D images and to a method of improving display quality when displaying such 3D images.

2. Description of Related Technology

Generally, a liquid crystal display (LCD) apparatus or another such flat panel display produces at its primitive operational level, only a two-dimensional ("2D") image. Recently, demand for displaying 3D images has been increasing in video gaming applications, in the movie industries, and so on. Additions have been made or proposed for causing the basic liquid crystal display or other such flat panel display to appear as if it is producing 3D images.

Generally, a stereoscopic image display apparatus displays the 3D image using a binocular parallax effect as between the two eyes of a human viewer. For example, because the two eyes of a human are generally spaced apart from each other and images viewed by the respective eyes from different angles of viewing are processed by the human brain as representing a 3D image, various means may be employed to present respectively different 2D images to the respective left and right eyes of a human viewer with the expectation that the human brain will mix the images such that the viewer perceives them as forming a stereoscopic image.

The stereoscopic image displaying devices may be divided into those of a stereoscopic type and those of an auto-stereoscopic type depending on whether a viewer wears an extra spectacle or not. The stereoscopic type may include an anaglyph type and a shutter glass type and so on. In the anaglyph type, blue glasses and red glasses may be required for the viewer to wear. In the shutter glass type, a left image and a right image may be temporally divided to be periodically displayed, and a viewer wears glasses which opens and closes a left eye shutter and a right eye shutter in synchronization with the period of the left and right images.

The auto-stereoscopic type of 3D image displays may include a lenticular type and/or a barrier type. In the lenticular type, a lenticular lens having a plurality of focal points is used. The 2D image is refracted by the lenticular lens at the focal points of the left and right eyes so that the 3D image is displayed. In the barrier type, a plurality of movable barriers selectively cover parts of a display panel in synchronism with when the left eye and the right eye respectively are to receive corresponding imagery. The barriers selectively block one part or another of an image on the display panel so that a perceived left image and right image may become different from each other. Thus, a same time displayed 2D image has barrier-blocked portions that are converted into the 3D image partly because of use of shifting barriers.

When the 2D image is so converted into the 3D image, an effective resolution of the liquid crystal display apparatus is decreased because part of the display area (DA) is used to support a left eye image and only a further part is used for the right eye image so that the display quality for each eye alone may be deteriorated. Also image crosstalk may undesirably occur, which means that a left image is shown to a right eye or a right image is shown to a left eye, thereby possibly confusing the image mixing operations of the human brain. Also, if a backlight assembly is repetitively turned on and off to prevent crosstalk, a perceived luminance of the display panel may be decreased.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provide a display apparatus which displays a 3D image by way of a selective light blocking and directing method (using a so-called, light directing element) where the display apparatus is operated to prevent or reduce crosstalk between left and right eye views and to thus improve a display quality of the displayed three-dimensional ("3D") image.

In an exemplary embodiment, the display apparatus includes a display panel, a display panel driver, a light source part, a light directing element and a barrier driver. The display panel is driven by dividing a single 3D image frame into plural sub frames each providing a respectively angled view for stereoscopic production of the 3D image. The display panel driver provides a first image data signal to the display panel for use during a first sub frame and a second image data signal to the display panel for use during a second sub frame. The light source part provides light to the display panel. The light directing element is disposed between the display panel and the light source part. The light directing element includes a barrier part and a lens part disposed on the barrier part. The barrier part has a plurality of first electrodes and a plurality of second electrodes crossing the first electrodes. The barrier driver controls the barrier part so that a first barrier of the barrier part has a light transmitting state during the first sub frame, a second barrier of the barrier part adjacent to the first barrier has a light transmitting state during the second sub frame and both the first and second barriers have a light blocking state during a transition period and in a transitioning portion of the display panel where one of the first and second subframes is overwriting the other.

In the exemplary embodiment, the barrier part may drive the barrier part in synchronization with a scanning timing of the display panel. A barrier of the barrier part may have a blocking state during an early scanning period of each sub-frame and may have a transmitting state after the early scanning period.

In the exemplary embodiment, a duration of the early scanning period may correspond to a transient response period of a liquid crystal layer of the display panel.

In the exemplary embodiment, a scanning direction of the display panel may be substantially the same as a scanning direction of the barrier part. The scanning direction of the display panel may be substantially the same as an extending direction of a barrier of the barrier part.

In the exemplary embodiment, the first electrodes may extend in a direction substantially perpendicular to the scanning direction of the display panel. The second electrodes extend in the scanning direction of the display panel.

In the exemplary embodiment, a voltage signal applied to each of the first and second electrodes may be one having 3 discrete levels, namely, a zero volt level, a positive blocking voltage level and a negative blocking voltage level.

In the exemplary embodiment, a first voltage signal may be applied to odd-numbered ones of the second electrodes. A different second voltage signal may be applied to even-numbered ones of the second electrodes.

In the exemplary embodiment, the first voltage signal applied to the odd-numbered second electrodes may be inverted with respect to the second voltage signal applied to the even-numbered second electrodes.

In the exemplary embodiment, a width of a barrier of the barrier part in a first direction may be substantially equal to or less than half of a width of a repeated lens unit of the lens part in the first direction.

In the exemplary embodiment, the barrier part may include a first barrier substrate having the first electrodes, a second barrier substrate facing the first barrier substrate and having the second electrodes and a respective liquid crystal layer disposed between the first and second barrier substrates.

In the exemplary embodiment, the light source part may be continuously turned on when the display apparatus is turned on and displaying a 3D image.

In an exemplary embodiment of a method of displaying a three-dimensional ("3D") image according to the present disclosure of invention, the method is machine-implemented and includes providing first image data to a display panel during a first sub frame and second image data to the display panel during a second sub frame, providing light to the display panel and controlling a barrier part including a plurality of first electrodes and a plurality of second electrodes so that a first barrier of the barrier part has a transmitting state during the first sub frame and a second barrier of the barrier part adjacent to the first barrier has a transmitting state during the second sub frame and both the first and second barriers have a light blocking state during a transition period and in a transitioning portion of the display panel where one of the first and second subframes is overwriting the other. The display panel is driven by dividing a single frame into plural sub frames. The barrier part is disposed between the display panel and a light source part.

In the exemplary embodiment, the barrier part may be driven in synchronization with a scanning timing of the display panel. A barrier of the barrier part may have a blocking state during an early scanning period of predetermined duration and has a transmitting state after the early scanning period.

In the exemplary embodiment, the duration of the early scanning period may correspond to a transient response period of a liquid crystal layer of the display panel.

In the exemplary embodiment, a scanning direction of the display panel may be substantially the same as a scanning direction of the barrier part. The scanning direction of the display panel may be substantially the same as an extending direction of a barrier of the barrier part.

In the exemplary embodiment, a tri-level voltage signal applied to each of the first and second electrodes may be one having as its predetermined levels, a zero volt, a positive blocking voltage and a negative blocking voltage.

In the exemplary embodiment, a first voltage signal may be applied to odd-numbered second electrodes. A second voltage signal may be applied to even-numbered second electrodes.

In the exemplary embodiment, the first voltage signal applied to the odd-numbered second electrodes may be inverted with respect to the second voltage signal applied to the even-numbered second electrodes.

In the exemplary embodiment, a width of a barrier of the barrier part in a first direction may be substantially equal to or less than half of a width of a repeated lens unit of a lens part in the first direction, the lens part being disposed on the barrier part.

In the exemplary embodiment, the light source part may be continuously turned on when the display apparatus is turned on.

According to the display apparatus and the method of displaying the 3D image using the display apparatus, a barrier part is driven by a scanning driving method and the barrier part has a blocking state during an early scanning period. Thus, the crosstalk may be prevented so that the display quality of the 3D image may be improved.

BRIEF DESCRIPTION OF THE DRAWINGS

The above and other features and advantages of the present disclosure of invention will become more apparent by describing in detailed exemplary embodiments thereof with reference to the accompanying drawings, in which.

DETAILED DESCRIPTION

Hereinafter, exemplary embodiments in accordance with the present disclosure will be described in further detail with reference to the accompanying drawings.

Figure 1:
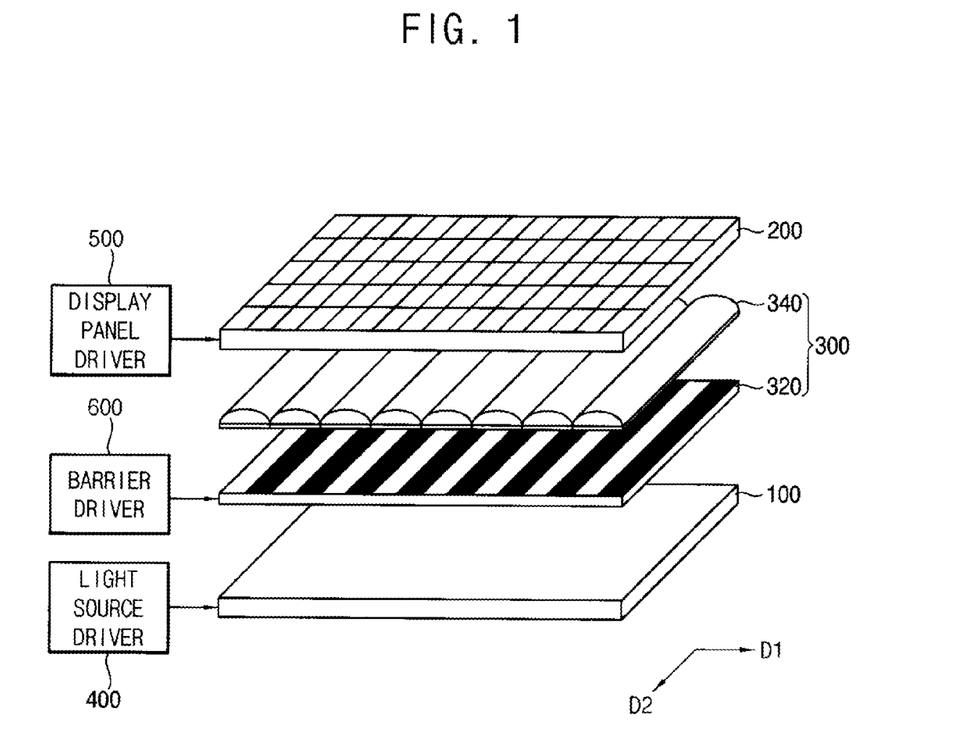
FIG. 1 is a perspective view illustrating a display apparatus according to an exemplary embodiment of the present disclosure.

FIG. 1 is a perspective view illustrating a display apparatus according to an exemplary embodiment of the present disclosure.

Referring to FIG. 1, the display apparatus includes a light source part (a.k.a. a backlighting unit) 100, a display panel (e.g., a Liquid Crystal Display (LCD)) 200, a light directing element 300, a light source driver 400, a display panel driver 500 and a barrier driver 600.

The light source part 100 provides a backlighting light for transmittance to the display panel 200. As will become apparent, a light rays directing part 300 is interposed between the light source part 100 and the display panel 200 for controlling direction of light rays as they pass through the display panel 200 and towards a user's eyes (see also briefly FIGS. 2A and 2B.) The light source part 100 includes one or more light sources configured for generating a correspondingly source area of light(s). For example, the light sources may include one or more of cold cathode fluorescent lamps ("CCFLs"), external electrode fluorescent lamps ("EEFLs"), flat fluorescent lamps ("FFLs"), light emitting diodes ("LEDs") and so on. The light source part 100 may be a directly backlighted assembly or an edge lighted assembly having a light guide plate (LGP) which converts edge sourced light into upwardly projected and laterally distributed light.

In the present exemplary embodiment, the light source part 100 may be continuously turned on and producing light in all its areas when the display apparatus is turned on. Alternatively, the light source part 100 may be driven in a scanning driving method or a blinking driving method. Alternatively, the light source part 100 may include a plurality of light source blocks and the light source blocks may be independently driven according to an image displayed on the display panel 200 and when in a local dimming driving mode.

As mentioned, the light source part 100 may be a direct type light source part which is disposed under the display panel 200 to provide a light directly upwardly to the display panel 200. Alternatively, the light source part 100 may be an edge type light source part which is disposed corresponding to an edge of the display panel 200 to provide a light to the display panel 200. When the light source part 100 is the edge type light source part, the light source part 100 may further include a light guide plate (not shown).

The display panel 200 has a plurality of pixels that are actuated to form a corresponding one or more images for projection to one or both of the user's left and right eyes. The display panel 200 is disposed over the light source part 100 with the light rays directing part 300 being interposed between. As mentioned, the display panel 200 includes a plurality of pixels. The pixels may be disposed in a regular matrix pattern or in other display area populating patterns. For the case of the Liquid Crystal Display (LCD) type, the display panel includes a first panel substrate (not shown), a second panel substrate (not shown) facing the first panel substrate and a liquid crystal layer (not shown) disposed between the first and second panel substrates.

Figure 3:
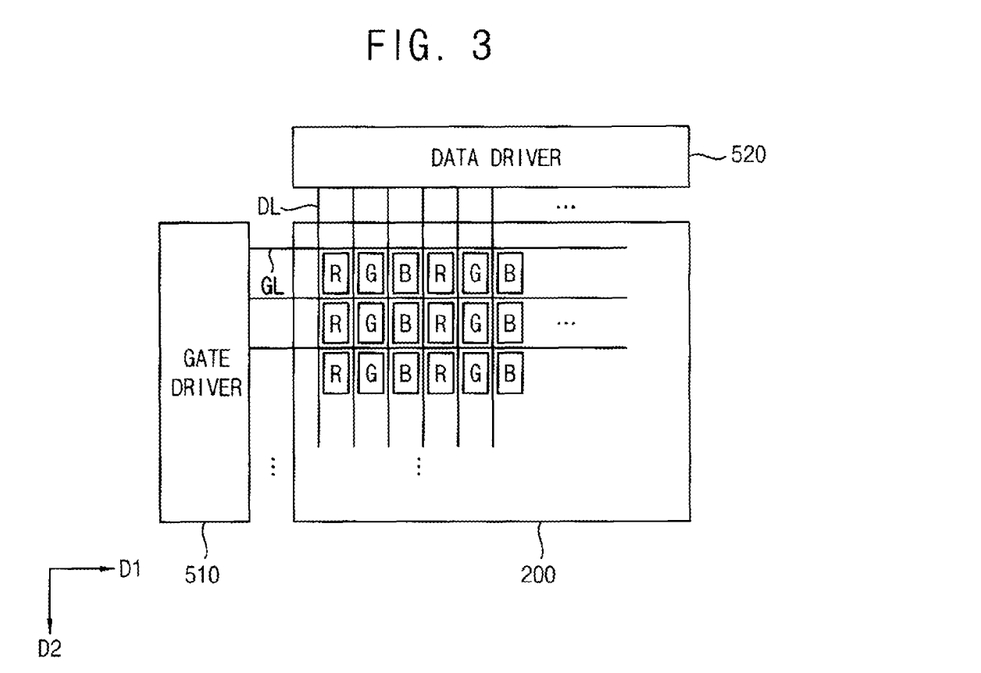
FIG. 3 is a plan view illustrating a display panel, a gate driver and a data driver of FIG. 1.

A structure of the display panel 200 is explained referring to FIG. 3 in detail.

As mentioned, the light directing element 300 is disposed between the light source part 100 and the display panel 200. The light directing element 300 includes a barrier part 320 and a lens part 340. The light directing element 300 adjusts the light rays emanating from the light source part 100 so that they are respectively projected to the left or right eye of the user to thus convert the innate 2D image into a 3D image.

Figure 2A:
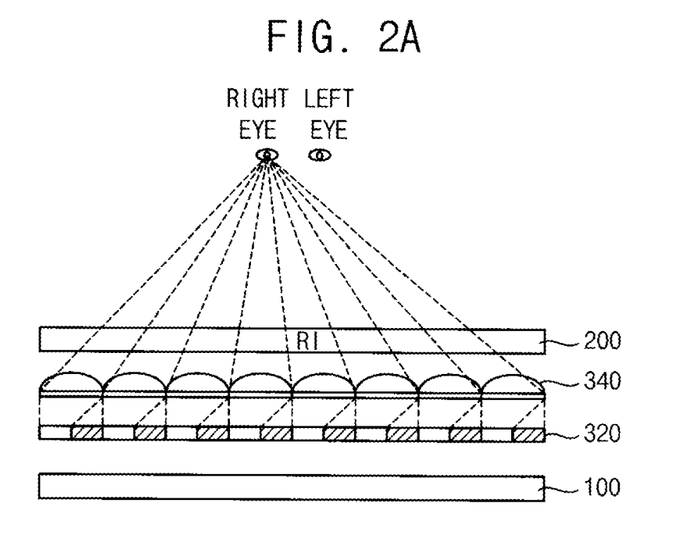
FIG. 2A is a conceptual diagram illustrating images provided to a right eye of a viewer by a display panel and a light directing element of FIG. 1 when displaying an odd-numbered frame.
Figure 2B:
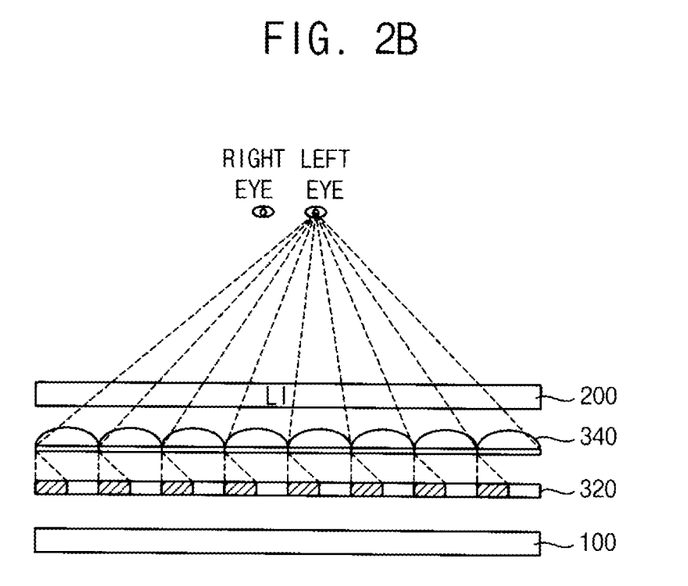
FIG. 2B is a conceptual diagram illustrating images provided to a left eye of the viewer by the display panel and the light directing element of FIG. 1 when displaying an even-numbered frame.

A method of directing the light rays of the 2D image respectively to the left or right eye of the user to thus form a 3D image by operation of the light directing element 300 is explained by referring to FIGS. 2A and 2B in detail.

The barrier part 320 is disposed on the light source part 100. The barrier part 320 includes a plurality of barriers that are electronically controllable to selectively cover (shade) one set of subareas of the light source part 100 or another set. The barriers selectively cause transmittal of light from the uncovered subareas of the light source part 100 to the lens part 340.

In one embodiment (LCD type barrier), the barrier part 320 includes a first barrier substrate, a second barrier substrate facing the first barrier substrate and a barrier liquid crystal layer disposed between the first and second barrier substrates.

For each selectively uncoverable subarea of the light source part 100, a corresponding first electrode may be formed on the first barrier substrate while a corresponding second electrode is formed on the second barrier substrate. According to voltages applied to the first and second electrodes, the respective barrier of the barrier part 320 has a light rays transmitting state or a light rays blocking state.

Each selectively activatable barrier may have a rectangular shape extending in a direction. For example each barrier may extend in a so-called, second direction D2 of FIG. 1. The barriers of the barrier part 320 may therefore be disposed in a stripe pattern. Alternatively, the barriers of the barrier part 320 may be disposed in a matrix pattern.

Figure 4:
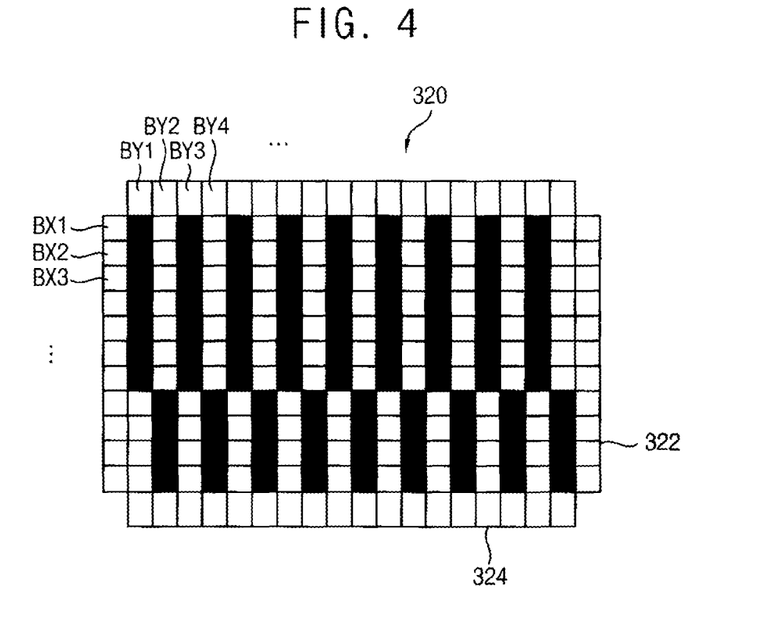
FIG. 4 is a plan view illustrating an operation of a barrier part of FIG. 1.

A structure an operation of a matrix type barrier part 320 is explained referring to FIG. 4 in detail.

The lens part 340 is disposed above the barrier part 320. The lens part 340 transmits the light rays passing from the light source part 100 and through the barrier part 320 to the display panel 200 for further transmittal therethrough to the respective left and right eyes of the user.

The lens part 340 includes a plurality of lens units. The lens units are disposed one adjacent to the next along the first direction D1. The lens units each extend in the second direction D2.

A width of the barrier in the first direction D1 may be substantially a half of a base width of the corresponding lens unit above it where the base width of the lens unit is also measured in the first direction D1 and the base width is one where a thickness of the lens part 340 is ignored. When optical transmission path effects of the thickness of the lens part 340 are considered (to the user's eye), the width of the barrier in the first direction D1 may be slightly greater than a half of the base width of the lens unit in the first direction D1.

Alternatively, in some embodiments, the width of the barrier in the first direction D1 may be less than a half of the width of the lens unit in the first direction D1.

The light source driver 400 is connected to the light source part 100. The light source driver 400 generates a light source driving voltage for driving the corresponding light source(s) of the light source part 100. The light source driver 400 receives a light source control signal from an outside control unit. The light source driver 400 generates the light source driving voltage based on the light source control signal. The light source driver 400 outputs the light source driving voltage to the light source part 100. The light source driver 400 may include a DC (direct current) to DC converter.

The light source driver 400 may be disposed under the light source part 100. The light source driver 400 may be disposed outside of a panel receiving container (not shown) and facing a bottom surface of the receiving container.

The display panel driver 500 is connected to the display panel 200. The display panel driver 500 generates panel driving signals for driving the display panel 200 to cause it to produce an image. The display panel driver 500 may drive the display panel 200 by dividing a single 3D frame into N sub frames and by providing different control signals for the respective sub frames. Here, N is a positive integer greater than one.

For example, the display panel driver 500 divides a single 3D frame into a first sub frame and a second sub frame. The first sub frame may be referred to also as an odd-numbered frame. The second sub frame may be referred to also as an even-numbered frame. The display panel driver 500 provides first image data to the display panel 200 during the first sub frame. The display panel driver 500 provides second and often different image data to the display panel 200 during the second sub frame.

The display panel driver 500 includes a gate lines driver and a data lines driver.

The gate lines driver generates gate signals for driving the gate lines of the display panel 200. The gate lines driver outputs the gate signals to the gate lines. The gate lines driver sequentially outputs the gate signals to the gate lines so that the display panel 200 is driven by a scanning driving method.

The data lines driver generates data voltages for driving the data lines of the display panel 200. The data lines driver outputs the data voltages to the data lines.

The barrier driver 600 is connected to the barrier part 320. The barrier driver 600 generates a barrier driving signal for driving the barrier part 320. In accordance with the present disclosure, the barrier driver 600 drives the barrier part 320 by dividing a single frame into N sub frames.

For example, the barrier driver 600 divides a single 3D frame into a first sub frame and a second sub frame. In one embodiment, the barrier driver 600 respectively controls first barriers and second barriers adjacent to the first barriers so that only the first barriers have transmitting states during the first sub frame and only the second barriers have transmitting states during the second sub frame.

The barrier driver 600 sequentially outputs corresponding barrier driving signals to rows of the barrier part 320 so that the barrier part 320 is driven by a scanning driving method. The barrier driver 600 drives the barrier part 320 in synchronization with a row scanning timing of the display panel 200. A row scanning direction of the barrier part 320 is the same as a row scanning direction of the display panel 200. From FIG. 4 it may be appreciated that the odd image columns (Y1, Y3, Y5, etc.) were charged (painted) in a previous subframe and now, in FIG. 4, the row by row scanning is proceeding to paint (refresh) the pixel data of the even numbered columns (Y2, Y4, Y6, etc.). At the same time, the barriers of the being-refreshed even numbered columns (Y2, Y4, Y6, etc.) are being opened up to let light rays through while the barriers of the older and next-to-be-refreshed odd image columns (Y1, Y3, Y5, etc.) are being closed to thereby block light rays from passing therethrough.

FIG. 2A is a conceptual diagram illustrating how light rays of a right eye image are selectively provided to a right eye of a viewer by the display panel 200 when the light directing element 300 of FIG. 1 is in an odd-numbered frame mode. FIG. 2B is a conceptual diagram illustrating how light rays of a left eye image are selectively provided to a left eye of the viewer by the display panel 200 when the light directing element 300 of FIG. 1 is in an even-numbered frame mode.

Hereinafter, a method of displaying the 3D image of the display apparatus when the display panel 200 is driven by dividing frames into the odd-numbered frames and into the even-numbered frames is explained in more detail referring to FIGS. 1, 2A and 2B.

Referring to FIG. 2A, the display panel 200 displays a first image corresponding to first (or right eye) data RI when fully in the odd-numbered frame mode. The first image data RI may represent a right image for the right eye of the viewer.

During the illustrated odd-numbered frame mode of FIG. 2A, the first barriers have transmitting states and the second barriers adjacent to the first barriers have blocking states. The first barriers and the second barriers may be alternately disposed with each other in the first direction D1. In addition, each of the barriers may extend in the second direction D2.

During the odd-numbered frame mode, the light from the light source part 100 has available to it a first line-of-sight path, which is toward the right eye of the viewer, this being so because the first barriers have the illustrated transmitting states and the lens units of the lens part 340 focus the passed through light rays to the right eye. (Note that FIG. 2A is not to scale and is conceptual in nature.)

Thus, the right eye of the viewer views the right image RI based on the light having the first path during the odd-numbered frame mode.

Referring to FIG. 2B, the display panel 200 displays a second image corresponding to second (or left eye) image data LI when in the even-numbered frame mode. The second image data LI may represent a left image for receipt predominantly by the left eye of the viewer.

During the even-numbered frame, the first barriers have blocking states and the second barriers adjacent to the first barriers have transmitting states. The first barriers and the second barriers may be alternately disposed with each other in the first direction D1. In addition, the barriers may each extend in the second direction D2.

During the even-numbered frame mode of FIG. 2B, the light rays from the light source part 100 have a second line-of-sight path, which is predominantly toward the left eye of the viewer because the second barriers have the transmitting states and the lens units of the lens part 340 focus the passed through light rays to the left eye. (Note that FIG. 2B is not to scale and is conceptual in nature.)

Thus, the left eye of the viewer predominantly views the left image LI based on the light having the second line-of-sight path during the even-numbered frame mode.

Therefore, the brain of the viewer mixes the received right image RI inputted from the right eye of the viewer and the received left image LI inputted from the left eye of the viewer so that the viewer may perceive a corresponding 3D image.

Although the right image RI is displayed in the odd-numbered frame mode and the left image LI is displayed in the even-numbered frame mode in the above explained exemplary embodiment, the present disclosure of invention is not limited thereto. For example and alternatively, the left image LI may be displayed in the odd-numbered frame and the right image RI may be displayed in the even-numbered frame.

FIG. 3 is a plan view illustrating the display panel 200, the gate lines driver 510 and the data lines driver 520 of FIG. 1.

Referring to FIGS. 1 and 3, the display panel 200 of the illustrated example has an elongated rectangular shape. For example, the display panel 200 has a longer side in the first direction D1 and a shorter side in the second direction D2.

The display panel 200 includes a plurality of gate lines GL, a plurality of data lines DL crossing the gate lines GL and a plurality of pixel units, R, G and B connected to and controlled by the gate lines GL and the data lines DL.

The gate lines GL extend in the first direction D1. The gate lines GL are disposed one after the next in the second direction D2. The data lines DL extend in the second direction D2. The data lines DL are disposed one after the next in the first direction D1.

The pixel units may each be a selected one of a red pixel R, a green pixel G and a blue pixel B. Alternatively or additionally, the unit pixel may be one of a white pixel, a yellow pixel, a magenta pixel and a cyan pixel.

Each pixel unit may have an elongated rectangular shape. For example, the pixel unit may have a shorter side in the first direction D1 and a longer side in the second direction D2. Alternatively, the unit pixel may have a shorter side in the second direction D2 and a longer side in the first direction D1.

The unit pixels R, G and B may be disposed in a matrix pattern. For example, a first pixel column includes red pixels R, a second pixel column includes green pixels G and a third pixel column includes blue pixels B. Alternatively, each of the first to third pixel columns may include red, green and blue pixels R, G and B alternately disposed with one another.

Alternatively, a first pixel row includes red pixels R, a second pixel row includes green pixels G and a third pixel row includes blue pixels B. Alternatively, each of the first to third pixel rows may include red, green and blue pixels R, G and B alternately disposed with one another.

Alternatively, red, green and blue pixels R, G and B are alternately disposed along a row direction with one another and alternately disposed along a column direction with one another.

The display panel driver 500 includes the gate lines driver 510 and the data lines driver 520.

The gate lines driver 510 may be disposed adjacent to a side portion of the display panel 200. The data lines driver 520 may be disposed adjacent to an upper portion of the display panel 200.

The gate lines driver 510 receives a first control signal (e.g., vertical sync) from a timing controller (not shown). The gate lines driver 510 generates a sequence of gate signals for sequentially driving (activating) the gate lines GL of the display panel 200 in response to the first control signal. The gate lines driver 510 sequentially outputs the gate activating signals to the respective gate lines GL. Herein for purpose of example, a scanning direction of the display panel 200 is defined as the second direction D2.

The gate lines driver 510 may include a gate printed circuit board ("PCB", not shown) and a gate lines driving chip (not shown). The gate lines driving chip may be disposed on a tape carrier package ("TCP") connecting the gate PCB to the first panel substrate of the display panel 200.

Alternatively, the gate lines driver 510 may be directly and integrally mounted on the display panel 200. The gate driver 510 may be monolithically integrated on the display panel 200.

The data lines driver 520 receives image-representing data signals and a second control signal (e.g., horizontal sync) from the timing controller. The data lines driver 520 converts the digital data signals into analog data voltages having respective analog magnitudes in response to the second control signal. The data lines driver sequentially outputs the data voltages to the data lines DL of the display panel 200.

The data lines driver 520 may include a data PCB (not shown) and a data driving chip (not shown). The data driving chip may be disposed on a TCP connecting the data PCB to the first panel substrate of the display panel 200.

Alternatively, the data lines driver 520 may be directly mounted on the display panel 200. The data driver 520 may be monolithically integrated on the display panel 200.

FIG. 4 is a plan view illustrating the barrier part 320 of FIG. 1 in a mode that part way through refreshing the image of the display area (DA).

Referring to FIGS. 1, 3 and 4, the barrier part 320 includes the first barrier substrate 330, the second barrier substrate 340 facing the first barrier substrate 330 and the barrier liquid crystal layer (not shown) disposed between the first and second barrier substrates 330 and 340.

The first barrier substrate 330 includes a plurality of first electrodes BX1, BX2, BX3, etc. extending in the row direction. The second barrier substrate 340 includes a plurality of second electrodes BY1, BY2, BY3, etc. extending in the column direction. The individual barrier units are defined as the respective areas at which the first electrodes BX1, BX2, BX3, ... and the second electrodes BY1, BY2, BY3, ... cross with each other. The barrier units are disposed in a matrix pattern. The barrier part 320 may be driven in a passive matrix method.

An extending direction of the barrier stripes may be substantially same as the scanning direction of the display panel 200. For example, the stripe extending direction (and stripe reducing direction) of the barrier driver may be the second direction D2.

Figure 5:
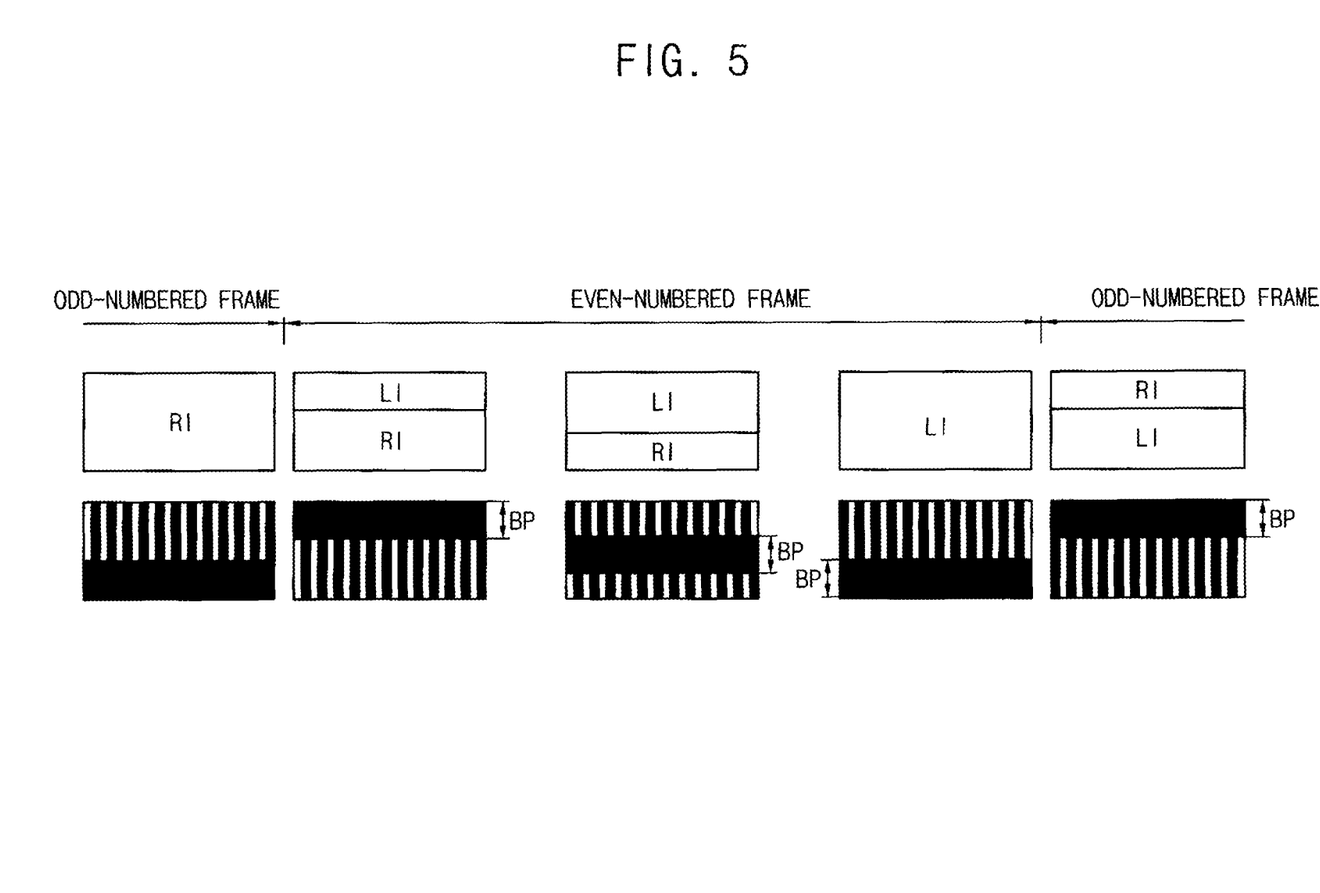
FIG. 5 is a conceptual diagram illustrating a scanning driving of the display panel and the barrier part of FIG. 1.
Figure 6:
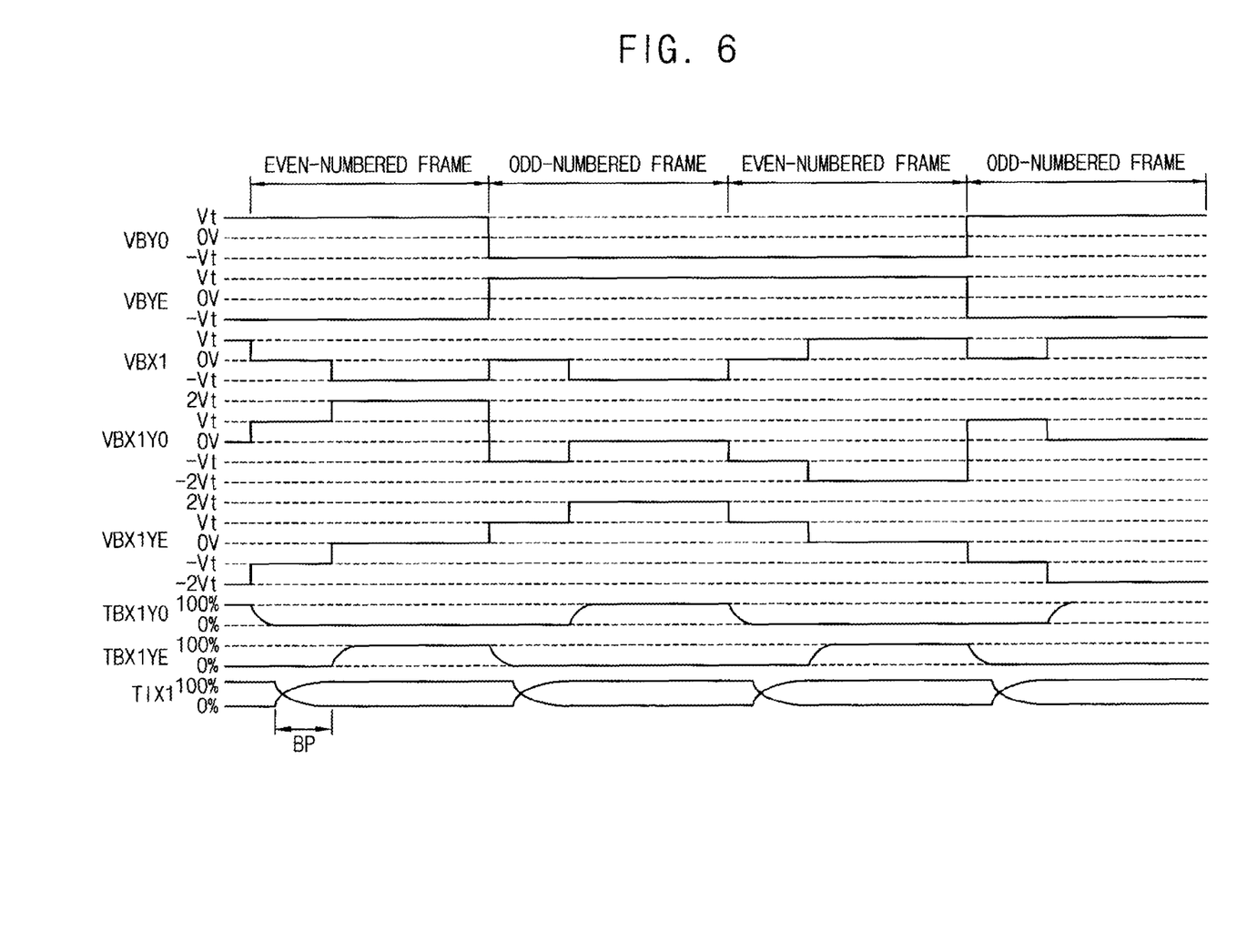
FIG. 6 is a waveform diagram illustrating barrier driving signals outputted from a barrier driver of FIG. 1.
Figure 7:
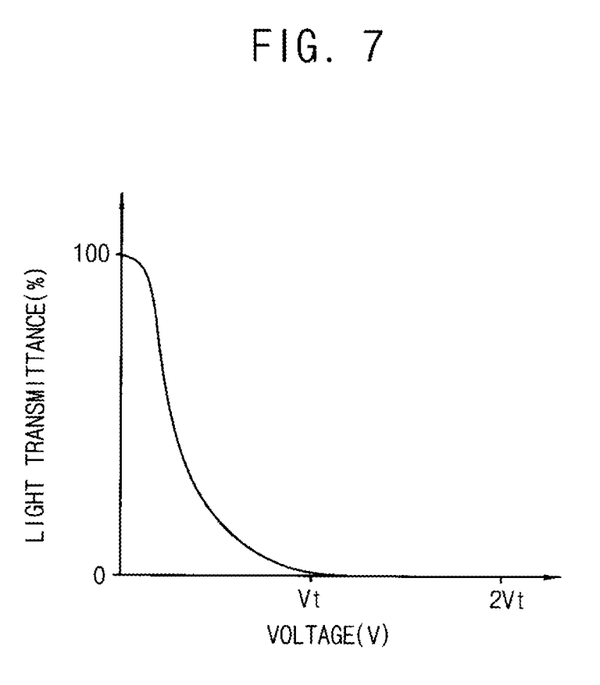
FIG. 7 is a graph illustrating a relatively light transmittance efficiency according to a voltage of the barrier part of FIG. 1.

FIG. 5 is a conceptual diagram illustrating a scanning driving of the display panel 200 and the barrier part 320 of FIG. 1. FIG. 6 is a waveform and timing diagram illustrating barrier driving signals outputted from the barrier driver 600 of FIG. 1. FIG. 7 is a graph illustrating a light transmittance according to a voltage of the barrier part 320 of FIG. 1.

Referring to the left most side of FIG. 5, and referring to an ending period of the first illustrated odd-numbered frame at that side, the first image data RI has been provided at this stage and essentially the entire display area (DA) is displaying the corresponding right eye image on the entire area of the display panel 200. (The illustrated horizontal and thin, all-columns light blocking bar (BP') at the bottom of the lower row represents the finishing of the painting (refreshing) of the right eye image at the bottom of the display area (DA).)

As the all-columns light blocking bar (BP') drops off from the bottom of the display area at the ending of the first or leftmost odd-numbered frame, a corresponding new, all-columns light blocking bar (BP) drops into the display area with the start of the second illustrated or so-called, even-numbered frame. Referring to a beginning period of that even-numbered frame, some of the second image data LI has been loaded into memory and is being painted into (refreshed into) an upper portion of the display panel 200 corresponding to a beginning portion of the scanning direction for the even-numbered frame. That being loaded and being painted imagery is not yet displayed. At the same time the first image data RI form the preceding odd-numbered frame is still being displayed on a lower portion of the display panel 200 corresponding to an ending portion of the scanning direction of the preceding odd-numbered frame.

By being painted or refreshed, it is meant here that the pixel units on the upper portion of the display panel 200 are having their older first image data RI being changed to the newer or second image data LI. As new data voltage is being charged into each pixel unit, its voltage transitions form the older magnitude to a desired new magnitude. During that transition time, the desired new image may not be displayed due to a transient response characteristic of the liquid crystal layer of the display panel 200. More specifically, as the formed image transitions from that of the previous frame to that of the newer replacement frame, the data voltages of the first image data RI and of the second image data LI may be mixed in the unit pixels on the upper portion of the display panel 200 so that a crosstalk effect takes place. One aspect of such crosstalk is that of the left image being shown to the right eye or that of the right image being shown to the left eye such confusion may occur.

However, in accordance with the present disclosure, the barrier driver 600 controls a portion of the barrier part 320 corresponding to where image re-painting (frame overwriting) is taking place (e.g., at the Li/Ri interface boundary) so that such a changing area is fully blocked out (for example in the Blacked-out Portion BP shown occupying the upper portion of the display panel 200 in the first 3rd of the even-numbered frame shown in FIG. 5) so that a user perception of crosstalk effects may be prevented. More specifically, in one embodiment, the width and placement of the Blacked-out Portion BP corresponds to the transient response time of the liquid crystal (LC) layer of the display panel 200 as that LC layer transitions from a first optical state corresponding to a stable left eye image ($Li_{\_Stable}$) to a second optical state corresponding to a stable right eye image ($Ri_{\_Stable}$).

Referring next to the middle third of the illustrated even-numbered frame of FIG. 5, in this state, the second image data LI is stably displayed in an upper portion of the display area (DA) of the display panel 200 and the first image data RI remains stably displayed in a lower portion of the display panel 200 while the Li-to-Ri transition zone is chronologically and spatially disposed as moving down from the central lateral line of the display area (DA) towards the bottom in accordance with the scanning direction.

In other words, in the pixel units of the central portion of the display panel 200, the pixel drive voltages are transitioning from those established by the older, first image data signals RI to those specified by the newer, second image data signals LI. The pixel drive voltages in this region may be part way between those of the first image data RI and those of the second image data LI such that a crosstalk effect may occur.

However, since in accordance with the present disclosure the barrier driver 600 controls that portion of the barrier part 320 corresponding to Li/Ri transition zone (BP) by maintaining a full blocking state for the location and duration of that Li/Ri transition zone—where the latter is represented by the Blacked-out Portion BP illustrated in FIG. 5, perception of the crosstalk effect may be prevented.

Referring next to the ending of last third portion of the time line for the even-numbered frame, the second image data LI is now almost fully, stably displayed over substantially the entire area of the display panel 200 and the Blacked-out Portion BP is therefore dropping down and out from the bottom of the display area (DA) as the last third portion comes to a close.

Referring next to the beginning of the second odd-numbered frame which is shown at the right side of FIG. 5, even newer first image data RI is being overwritten at the top of the display area (DA) to replace the now older, second image data LI. The first image data RI and the second image data LI may be mixed in the unit pixels corresponding to the Blacked-out Portion BP shown for the upper portion of the display panel 200 in the case of the beginning of the second odd-numbered frame in FIG. 5.

However, since in accordance with the present disclosure the barrier driver 600 controls that portion of the barrier part 320 corresponding to the illustrated Ri/Li transition zone (BP) by maintaining a full blocking state for the location and duration of that Ri/Li transition zone—where the latter is represented by the Blacked-out Portion BP illustrated in FIG. 5, perception of the crosstalk effect may be prevented.

FIG. 6 represents a voltages versus timing diagram for the voltage signals that are applied to the first and second electrodes (BXn and BYm, where n and m are integers here) of FIG. 4 to thereby operate the scanning driving of FIG. 5. Backlighting transmittance or blocking occurs according to the respective states of the barriers and according to the voltages applied to the first and second electrodes (BXn and BYm) during the Blacked-out Portion BP periods and according to the states that stabilize after the respective Blacked-out Portion BP periods. (In FIG. 6, the respective Blacked-out Portion BP periods occur for the illustrated cases where TIX1 is not stabilized to being substantially 100% or substantially 0%.)

Referring to FIGS. 6 and 7, VBX1 represents a voltage applied to the corresponding first row direction barrier electrode, BX1. VBYo represent voltages applied to the odd-numbered (O-numbered) second electrodes BY1, BY3, BY5, .... VBYe represent voltages applied to the even-numbered (E-numbered) second electrodes BY2, BY4, BY6, .... As seen in FIG. 6, the VBYo and VBYe barrier drive signals are 180 degrees out of phase with one another and they switch at the even-to-odd frame transition boundary (but not at the odd-to-even frame transition boundary).

For example, the same voltage signal VBYo may be simultaneously applied to the odd-numbered second electrodes BY1, BY3, BY5, .... The same voltage signal VBYe may be applied to the even-numbered second electrodes BY2, BY4, BY6, .... The voltage VBYO applied to the odd-numbered second electrodes BY1, BY3, BY5, ... may be a voltage inverted from the voltage VBYE applied to the even-numbered second electrodes BY2, BY4, BY6, ....

Each of the VBX1, VBYO and VBYE signals may respectively have three levels (although not necessarily same level magnitudes). For example, each of the VBX1, VBYO and VBYE may have as their respective 3 discrete levels, the levels of about 0V, a positive blocking voltage Vt and a negative blocking voltage $-Vt$.

VBX1YO is a voltage signal corresponding to the subtraction operation of VBYO$-$VBX1. VBX1YE is a voltage signal corresponding to the subtraction operation of VBYE$-$VBX1.

TBX1YO represents relative optical transmittance efficiencies of the first barriers which are defined by the first first electrode BX1 and the odd-numbered second electrodes BY1, BY3, BY5, .... The transmittances of the first barriers TBX1YO are adjusted by VBX1YO. When VBX1YO has a voltage of about 0V, the transmittances of the first barriers TBX1YO are about 100% so that the first barriers have the transmitting state. When VBX1YO has a voltage of $+Vt$ or $-Vt$, the transmittances of the first barriers TBX1YO are close to 0% so that the first barriers have the light blocking state. When VBX1YO has a voltage of $+2Vt$ or $-2Vt$, the transmittances of the first barriers TBX1YO are about 0% so that the first barriers have the light blocking state.

TBX1YE represents the relative transmittances of the second barriers which are defined by the first first electrode BX1 and the even-numbered second electrodes BY2, BY4, BY6, .... The transmittances of the second barriers TBX1YE are adjusted by VBX1YE. When VBX1YE has a voltage of about 0V, the transmittances of the second barriers TBX1YE are about 100% so that the second barriers have the transmitting state. When VBX1 has a voltage of $+Vt$ or $-Vt$, the transmittances of the second barriers TBX1YE are close to 0% so that the second barriers have the light blocking state. When VBX1YE has a voltage of $+2Vt$ or $-2Vt$, the transmittances of the second barriers TBX1YE are about 0% so that the second barriers have the light blocking state.

TIX1 plot at the bottom of FIG. 6 represents transmittances of the pixel units corresponding to the first barriers and the second barriers. As indicated by that bottom plot, the Blacked-out Portion BP preferably occurs while the pixel units are in a mixed or transition state where they are changing from stably displaying a first of the Li and Ri data sets to stably displaying a second and newer one of the Li and Ri data sets.

More specifically, when the odd-numbered frame is changed to the even-numbered frame, a crosstalk may occur at the unit pixels corresponding to the first barriers and the second barriers due to the transient response of the liquid crystal layers.

The first barriers of this case are set to have the blocking state before the unit pixels begin to be scanned. In addition, the second barriers maintain the blocking state during the early part of the scanning period BP. Thus, the crosstalk during the early part of the scanning period (BP) may be prevented.

According to the present exemplary embodiment, the barrier part 320, which is disposed between the light source part 100 and the display panel 200 is used to selectively block the light from the light source part 100, and it is driven by the scanning driving method such that the barrier has the full blocking state during the early scanning period BP so that the crosstalk may be prevented. In addition, the light source part 100 is not required to be repetitively turned on and off to prevent the crosstalk so that a luminance of the display panel may be increased in cases where the light source has a warm up period as it is turned back on. Thus, the display quality of the 3D image may be improved.

According to the exemplary embodiments of the present disclosure of invention as explained above, the barrier part of the display apparatus is driven by the scanning driving method so that the crosstalk may be prevented. Thus, the display quality of the 3D image may be improved.

The foregoing is illustrative of the present teachings and is not to be construed as limiting thereof. Although a few exemplary embodiments of the present invention have been described, those skilled in the art will readily appreciate in light of the foregoing that many modifications are possible in the exemplary embodiments without materially departing from the novel teachings and advantages of the present disclosure. Accordingly, all such modifications are intended to be included within the scope of the present teachings. In the claims, means-plus-function clauses are intended to cover the structures described herein as performing the recited function and not only structural equivalents but also functionally equivalent structures. Therefore, it is to be understood that the foregoing is illustrative of the present disclosure of invention and is not to be construed as limited to the specific exemplary embodiments disclosed, and that modifications to the disclosed exemplary embodiments, as well as other exemplary embodiments, are intended to be included within the scope of the teachings.

What is claimed is:

1. A display apparatus capable of displaying 3D images and comprising:
   a display panel that is configured to be driven by dividing a single 3D image frame into N sub frames displayed over time, N being greater than one;
   a display panel driver configured to provide first image data to the display panel for a first subset of the N sub frames and different second image data to the display panel for a second subset of the N sub frames;
   a light source part configured for providing light to the display panel;
   a light directing element disposed between the display panel and the light source part, the light directing element including a barrier part and a lens part, the lens part being interposed between the barrier part and the display panel, the barrier part having a plurality of first electrodes and a plurality of second electrodes crossing the first electrodes; and
   a barrier driver configured for controlling the barrier part so that a first barrier of the barrier part has a light transmitting state during corresponding stable display of a first subset of the sub frames and so that a second barrier of the barrier part, which second barrier is disposed adjacent to the first barrier, has a light transmitting state during corresponding stable display of the second subset of the sub frames;
   wherein the barrier driver is further configured for causing both of the first and second barriers to simultaneously have respective and localized light blocking states for a corresponding localized portion of the display panel where the display panel is transitioning from displaying imagery of one to the other of the first and second subsets of the N sub frames.

2. The display apparatus of claim 1, wherein
   the barrier part is configured to drive the barrier part in synchronization with a scanning timing of the display panel, and
   the barrier driver is further configured for causing both of the first and second barriers to have respective and localized light blocking states during an early scanning period where imagery of one of the first and second subsets is overwriting that of the other and the barrier driver is yet further configured for causing one but not the other of the first and second barriers to have a light transmitting state after the early scanning period.

3. The display apparatus of claim 2, wherein a duration of the early scanning period corresponds to a transient response period of a liquid crystal layer of the display panel.

4. The display apparatus of claim 1, wherein
   a scanning direction of the display panel is substantially the same as a scanning direction of the barrier part, and
   the scanning direction of the display panel is substantially the same as an extending direction of a barrier of the barrier part.

5. The display apparatus of claim 4, wherein
   the first electrodes extend in a direction substantially perpendicular to the scanning direction of the display panel, and
   the second electrodes extend in the scanning direction of the display panel.

6. The display apparatus of claim 1, wherein a discrete voltage applied to each of the first and second electrodes is one of zero volts, a predetermined positive blocking voltage and a predetermined negative blocking voltage.

7. The display apparatus of claim 1, wherein
   when a first voltage is applied to odd-numbered ones of the second electrodes, a different second voltage is applied to even-numbered ones of the second electrodes.

8. The display apparatus of claim 1, wherein a first voltage signal applied to the odd-numbered second electrodes is inverted with respect to a second voltage signal applied to the even-numbered second electrodes.

9. The display apparatus of claim 1, wherein a width of a barrier of the barrier part in a first direction is substantially equal to or less than half of a width of a repeated lens unit of the lens part in the first direction.

10. The display apparatus of claim 1, wherein the barrier part includes a first barrier substrate having the first electrodes, a second barrier substrate facing the first barrier substrate and having the second electrodes and a liquid crystal layer disposed between the first and second barrier substrates.

11. The display apparatus of claim 1, wherein the light source part is configured to be continuously turned on when the display apparatus is turned on and providing a 3D image.

12. A machine-implemented method of displaying a three-dimensional ("3D") image, the method comprising:
   providing a first image data signal representing a corresponding first stereoscopic view that is to be displayed within a corresponding first sub frame of a 3D image frame;

providing a second image data signal representing a corresponding different and second stereoscopic view that is to be displayed within a corresponding second sub frame of the 3D image frame;

providing backlighting to a display panel that is to display the imagery of the first and second sub frames, where there is a barrier part interposed between a source of the backlighting and the display panel; and controlling the barrier part so that a first barrier of the barrier part has a light transmitting state during corresponding stable display of the first sub frame and so that a second barrier of the barrier part, which second barrier is disposed adjacent to the first barrier, has a light transmitting state during corresponding stable display of the second sub frame;

wherein the controlling of the barrier part further causes both of the first and second barriers to simultaneously have respective and localized light blocking states for a corresponding localized portion of the display panel where the display panel is transitioning from displaying imagery of one to the other of the first and second sub frames.

13. The method of claim 12, wherein the barrier part is driven in synchronization with a scanning timing of the display panel, and the controlling of the barrier part further causes both of the first and second barriers to have respective and localized light blocking states during an early scanning period where imagery of one of the first and second sub frames is overwriting that of the other and the controlling yet further causes one but not the other of the first and second barriers to have a light transmitting state after the early scanning period.

14. The method of claim 13, wherein the early scanning period corresponds to a transient response period of a liquid crystal layer of the display panel.

15. The method of claim 12, wherein a scanning direction of the display panel is substantially the same as a scanning direction of the barrier part, and the scanning direction of the display panel is substantially the same as an extending direction of a barrier of the barrier part.

16. The method of claim 12, wherein a voltage signal applied to each of opposed and crossing first and second electrodes of the barrier part has three discrete levels where one is a zero volt level, a second is a predetermined positive blocking voltage and a third is a predetermined negative blocking voltage.

17. The method of claim 12, wherein a first voltage signal is applied to odd-numbered ones of the second electrodes, and a different second voltage signal is applied to even-numbered ones of the second electrodes.

18. The method of claim 17, wherein the first voltage signal applied to the odd-numbered second electrodes is inverted with respect to the second voltage signal applied to the even-numbered second electrodes.

19. The method of claim 12, wherein a width of a barrier of the barrier part in a first direction is substantially equal to or less than half of a width of a repeated lens unit of a lens part in the first direction, the lens part being disposed between the barrier part and the display panel.

20. The method of claim 12, wherein there is a light source that provides backlighting to the display panel by way of having light rays of the backlighting selectively pass through the barrier part and where the light source is continuously turned on when the display apparatus is turned on and displaying a 3D image.

* * * * *